United States Patent
Thayer

[15] 3,643,499
[45] Feb. 22, 1972

[54] APPARATUS FOR SHEAR AND FATIGUE TESTING OF PINS

[72] Inventor: Arthur G. Thayer, Rossford, Ohio

[73] Assignee: Libbey-Owens-Ford Company, Toledo, Ohio

[22] Filed: Oct. 24, 1969

[21] Appl. No.: 869,115

[52] U.S. Cl. .................................................. 73/101, 73/91
[51] Int. Cl. ........................................ G01n 3/24, G01n 3/32
[58] Field of Search .................. 73/15.6, 91, 93, 100, 101

[56] References Cited

UNITED STATES PATENTS

| | | | |
|---|---|---|---|
| 544,007 | 8/1895 | Robischung | 73/100 |
| 2,317,097 | 4/1943 | Eksergian | 73/91 |
| 3,135,106 | 6/1964 | Lazan | 73/15.6 |
| 3,183,707 | 5/1965 | Gurney et al. | 73/91 X |
| 3,214,969 | 11/1965 | Swanson | 73/91 |

Primary Examiner—Charles A. Ruehl
Attorney—Collins and Oberlin

[57] ABSTRACT

Apparatus for testing shear pins to determine the most efficient notch design and base composition of metals and metal alloys from which the pins can be produced by subjecting specimen pins to conditions simulating the actual conditions under which they are to be used.

9 Claims, 9 Drawing Figures

INVENTOR
Arthur G. Thayer
BY Collins & Oberlin
ATTORNEYS

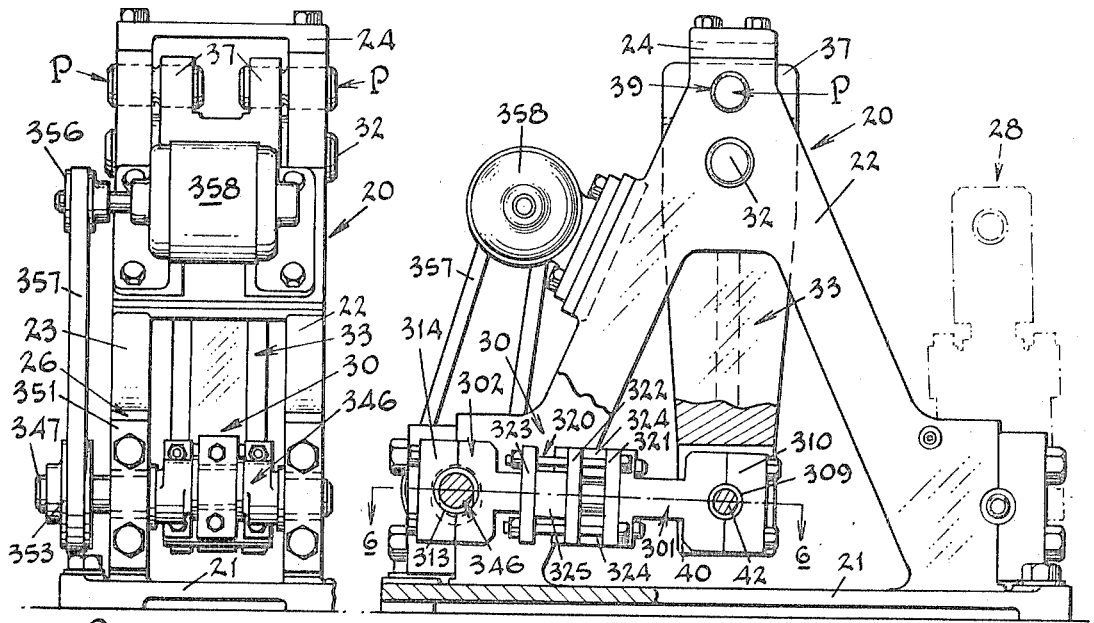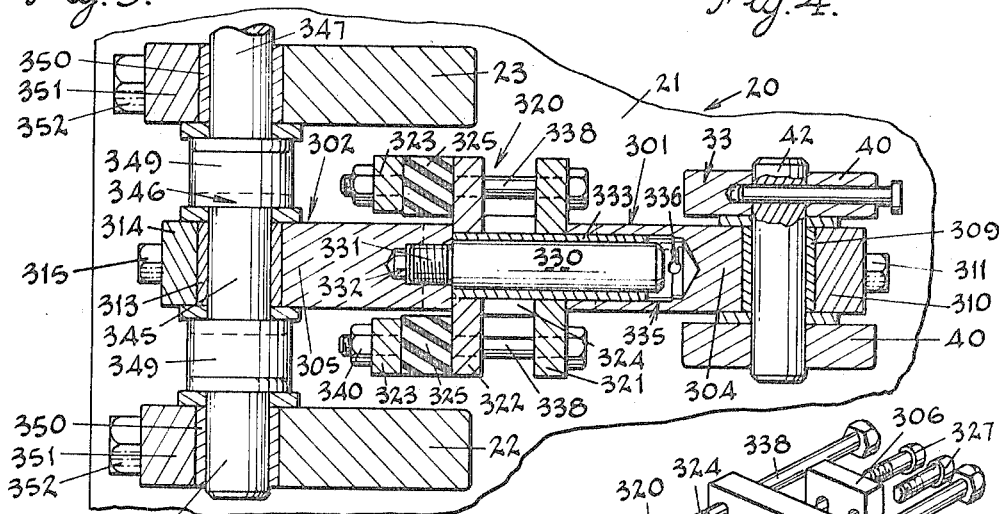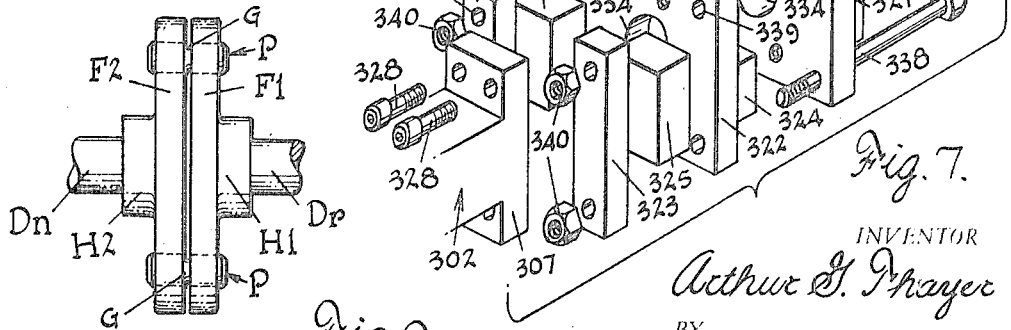

APPARATUS FOR SHEAR AND FATIGUE TESTING OF PINS

BACKGROUND OF THE INVENTION

It is known that prolonged and expensive delays in productive operations can be experienced when the power sources and/or structures driven thereby are damaged due to failure of such power to be properly transmitted. Such conditions of failure can exist when a driven structure resists the application of power and incurs damage to the driving source. One practical example is found in the shafting of a motor which, by rotation, operates a driven structure. To reduce the possibility of damage, the driving and the driven components of the shafting are coupled together by so-called "shear" pins that are adapted to break before costly physical damage can occur.

This invention contemplates the provision of means for testing and comparing the compositions of pins provided for this use before they are put to practical operation in order to obtain the longest period of use before failure thereof.

SUMMARY OF THE INVENTION

This invention is generally directed to testing apparatus and more particularly to means for determining the physical endurance characteristics of various specimen articles such as bars, rods and pins.

A primary object of this invention is to provide testing apparatus by which forces are applied to a specimen article in simulation of forces to which such articles are subjected to normal use.

Another object of the invention is to provide testing apparatus of the above character for comparing the endurance characteristics of specimen articles of differing designs and metal compositions to determine a desired composition for the articles and so obtain predictably prolonged periods of use.

Another object of the invention is to provide, in apparatus of the above character, means for subjecting a specimen article to application of force to determine the physical properties of such an article before failure due to shearing action.

A further object of the invention is to provide, in apparatus of the above character, means for determining the length of time an article can be utilized before failure due to fatigue of its metal structure.

Other objects and advantages will become apparent during the course of the following description when read in connection with the accompanying drawings.

In the drawings, wherein like numerals are employed to designate like parts throughout the same:

FIG. 4 is a side elevation of the testing apparatus, partly in section, illustrating its use in applying forces on an article to determine its resistance to fatigue;

FIG. 5 is an end elevation of the apparatus of FIG. 4;

FIG. 6 is a horizontal sectional view taken on the plane of line 6—6 of FIG. 4;

FIG. 7 is an exploded perspective view;

FIG. 9 is a diagrammatic view of an example of driving and driven elements in which metal pins are employed as coupling elements.

DETAILED DESCRIPTION OF THE INVENTION

Figure 8:
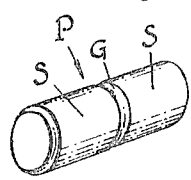
FIG. 8 is a perspective view of a typical shear pin.

Generally stated, apparatus, constructed in accordance with the instant invention, is employed to test metal articles that couple together the driving component from a source of power and a driven component. A pair of such bars, rods or like articles, in the form of a so-called "shear" pin, as in FIG. 8, are adapted to join the hub (see FIG. 9) mounted on an end of the driving shaft and a complementary hub attached to the opposed end of a shaft which, by way of example, turns a gear (not shown) to produce movement of a carriage or operation of other industrial equipment. In many uses, the movement of a carriage involves initial overcoming of the static weight and ultimate subjection of the shafting to abrupt resistance when the carriage is brought to a halt. Also, during more or less continuous repetitions of the starting and halting cycles, the shafting is subjected to physical vibrations occurring by reason of wear or otherwise loose play developed between working parts.

To prevent damage to the source of power, such as an electric motor, on one hand, and like damage to a gear train on the other, the aligned driving and driven shafts are coupled together by a pair of shear pins. In consequence, when a heavy object, such as a carriage, is inadvertently restrained from movement and resists operation of a driven shaft, the immediate opposition of driving force is absorbed by the shear pins which can result in breakage or "shearing" to disconnect the driving shaft from the driven component. Similarly, the repetitious transmissions of vibrations produces fatigue of the shear pin structure which results in costly intervals of "downtime" until replacement can be completed.

For these reasons, efforts have been directed to the procurement of shear pins having by their metal composition a predictable span of utility. This makes replacement of the pins possible during intervals of time when the motor and carriage, or other equipment, to be moved thereby, are not actively employed. In the form of pin P, illustrated in FIG. 8, it will be noted that the annular body thereof is provided with a groove G in its medial area. Since the mounting surfaces S of the pin are ground and polished to critical tolerances, it is preferred that the surface of the groove G be ground and polished to the same desired finish. As diagrammatically shown in FIG. 9, the groove G is generally of the substantially same width as the spaced distance between the flanged peripheries F1 and F2 of the H1 and H2, fixed on the ends of shafts Dr and Dn. For the design and handling factor for the pin, it has been found that fracture of the pin will or should occur through the area of minimum diameter. This has been found to materially reduce damage to the opposed surfaces of the flanges F1 or F2 and at the time enable relatively convenient removal of the broken ends of the pin.

Figure 1:
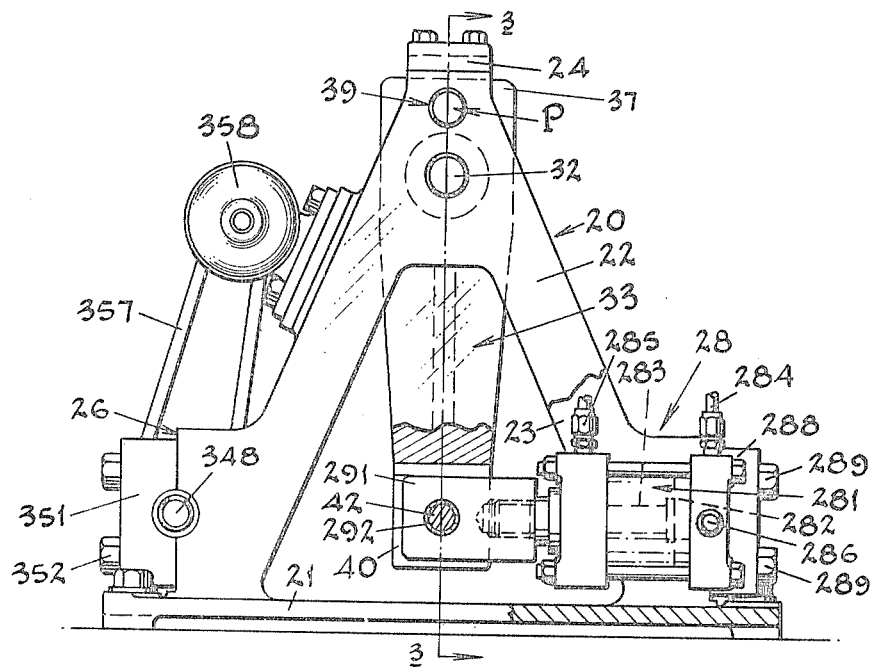
FIG. 1 is a side elevation, partly in section, of a preferred form of testing apparatus, constructed in accordance with the present invention and illustrating its use in applying shearing force on an article.

With reference now to FIGS. 1 and 4 of the drawings, there is shown apparatus, constructed in accordance with this invention, that is adapted to perform sequences of testing on specimen pins of various metal compositions to determine their comparative resistance to shearing forces and also of fatigue. As shown in FIG. 1, use of the apparatus is directed to the testing of pins for resistance to failure by shearing action. When the components of the apparatus are arranged as in FIG. 4, it is adapted to determine a predictable point at which failure of a pin will occur by reason of fatigue in its structure.

This apparatus is generally embodied in a substantially A-shaped structural framework, designated in its entirety by the numeral 20, having a base 21 and oppositely disposed sidewalls 22 and 23 that are joined at their upper ends by a cap-plate 24. Each sidewall is provided with oppositely disposed, finished end wall surfaces 25 and 26, respectively. The component parts of the units, employed with the framework, are indicated by the numeral 28 for shear testing (FIG. 1) and the numeral 30 for fatigue testing (FIG. 4).

Adjacent the upper ends of the walls 22 and 23, there is provided an axle 32 for swingably supporting a pendular-type lever 33 by a sleeve bearing 34. The axle 32 can be secured against endwise movement relative to the walls 22 and 23 by a suitable pin, if desired. Also, to maintain relative freedom of movement of the lever and to reduce wearing of the lever and wall surfaces, suitable antifriction washers 35 can be interposed therebetween.

Figure 3:
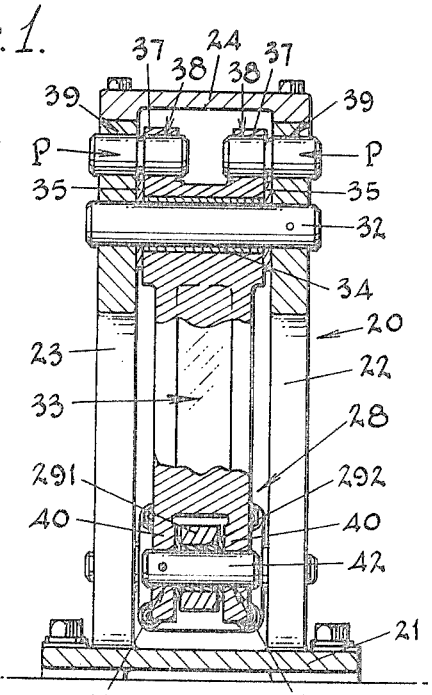
FIG. 3 is a transverse, vertical sectional view taken on the plane of line 3—3 of FIG. 1.

As seen in FIG. 3, the opposite ends of the body of the lever 33 are yoke-shape or bifurcated to provide pairs of spaced arms 37 and 40. The upper pair of arms 37 are cross-drilled to provide aligned pin-receiving holes 38 that are adapted to be axially aligned with holes 39 in the walls 22 and 23 when the lever is stationarily disposed. On the other hand, the lower pair of arms 40 are formed with aligned holes 41 to receive an axle 42 on which an end of either of the units 28 and 30 is supported and thus physically joined to the lever 33.

Figure 2:
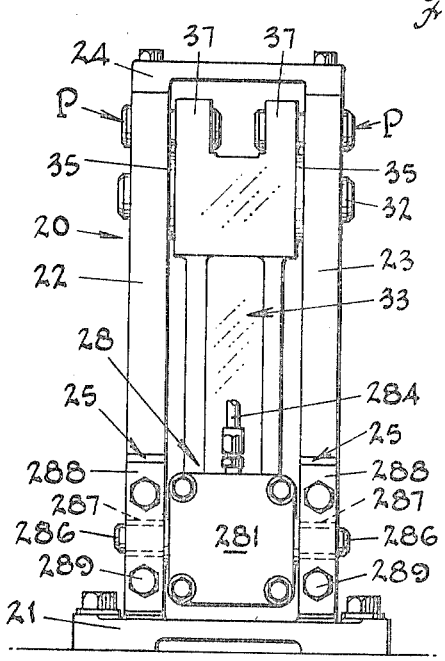
FIG. 2 is an end elevation of the apparatus of FIG. 1.

With reference to FIG. 1, the testing unit 28 comprises a cylinder actuator 281, an associated piston 282 and rod 283; the opposite ends of the cylinder being connected to a source of pressure by pipes 284 and 285. At its head end, the cylinder body is provided with aligned stub axles 286 which, as in FIG. 2, are journaled in sleeve bearings 287 that are mounted in caps 288 secured to the end walls 25 of the framework 10 by screws 289. At its outer end, the piston rod 283 mounts a connector block 291 that is cross-drilled to receive a sleeve bearing 292. When the shear testing unit 28 is functionally associated with the lever 33, as in FIGS. 1 and 3, the supporting axle 42 is journaled in the bearing 292.

THE FATIGUE TESTING UNIT

With reference now to FIGS. 4 to 7, inclusive, the fatigue testing unit 30 is adapted to produce substantially rapid reciprocal motion of the lever 33 when functionally associated therewith as in FIG. 4. For this purpose, the unit 30 is embodied in oppositely disposed body members 301 and 302 that are interjoined by a pressure absorbing unit, designated generally by the number 320. The body members are the same in form with mounting end portions 304 and 305, respectively, and oppositely disposed flanged end portions 306 and 307, respectively. Thus, the mounting end portion 304 of the body member 301 receives a sleeve bearing 309 which is supported thereon by a cap 310 secured to the mounting end by screws 311. The sleeve bearing 309 is adapted to serve as the journal for the supporting axle 42.

The mounting end portion 305 of the body member 302 is adapted to receive a sleeve bearing 313, supported thereon by a cap 314 secured to said mounting end by screws 315. The bearing 313 serves to journal the eccentrically located shaft portion 345 of a crankshaft 346.

The pressure absorbing unit 320, as best seen in FIGS. 6 and 7, is formed by plates 321, 322, bars 323 and pairs of blocks of resilient material 324 and 325. These blocks are preferably of a rubber or like material having a Durometer hardness as of about 80–85. Each pair of blocks can be adhered by a suitable adhesive to the opposite surfaces of the plates 322 to facilitate convenient and relatively fixed location of the blocks in the assembled arrangement of the unit 320. The flanged end 306 of the body member 301 is secured to the adjacent surface of the plate 321 by means of screws 327 threaded into said plate. Similarly, the flanged end 307 of the body member 302 is fixedly attached to the plate 322 by screws 328 threaded into plate 322.

The body members 301 and 302 are maintained in axial alignment by a guide pin or plug 330 having a threaded end 331 that is received in a tapped hole 332 in the member 302. The plug 330 slidably fits into a sleeve bearing 333 which is passed through aligned openings 334 in plates 321–322 and contained in a cylindrical bore or chamber 335 provided in the body member 301. To prevent the building of pressure in the bore 335, a relief port 336 can be provided.

The plates 321, 322 and bars 323 are brought together by means of screws 338 passed through aligned holes 339 in the corners of plates 321–322 and the upper and lower ends of the bars 323. By nuts 340, the plates and bars are brought together in assembled form with the pairs of rubber blocks 324 and 325 being accordingly compressed. Preferably, the degree of compression imposed on the blocks is determined by the precise distance to be established between the axis of the axle 42 and the axis of the eccentric shaft portion 345.

The crankshaft 346 has supporting axle portions 347 and 348 directed outwardly from the eccentric portion 345 and integrally interjoined by the arm portions 349. The axle portions 347 and 348 are similarly journaled in sleeve bearings 350 supported by caps 351 secured to the end surfaces of the framework 10 by screws 352. The outer end of axle portion 347 is equipped with a sheave 355 which is driven from a sheave 356 by a belt 357 trained thereabout. The sheave 356 is mounted on the output shaft of a motor 358 that can, as shown, be conveniently supported on the sidewalls 22 and 23 of the framework. It is believed obvious that the desired amount of "throw" of the crankshaft 346, as determined by the eccentric relation of the shaft portion 345 to the axle portions 347 and 348, can be readily changed by substitution of other crankshafts until a predetermined amount of reciprocal motion has been obtained for motion of the lever 33.

MODE OF OPERATION

SHEAR TESTING

When the shear testing unit 28 is actively mounted on the framework of the apparatus, a pair of shear pins P to be tested are inserted through the holes 39 in the sidewalls 22 and 23 until the surfaces of the entering ends are received in the holes provided in the upper arms 37 of the lever 33 with the medially located grooves G being disposed between the opposed surfaces of the sidewalls and arms. When so positioned, the inner ends of the pins will be acted upon during motion of the pendular lever while the outer ends of the pins are intended to remain substantially stationary in the holes of the sidewalls. In consequence, the actual forces applied will be directed against the reduced cross-sectional area of the grooves G in the same manner as described in connection with the diagrammatic illustration of FIG. 9. By way of example only, sufficient pressure is directed from pipe 284 into the head end of the cylinder actuator 281 until a force of 370 p.s.i. (pressure per square inch) is gradually developed within the cylinder chamber having an inner diameter as for example of approximately 6 inches. This gradually increased energy will cause the piston 282 and rod 283 to produce a force, by way of example, of about 10,400 pounds through the connector block 291 and axle 42 to the lower end of the lever 33. It is intended that the distance between the axes of axle 42 and axle 32 and the axle 32 and the shear pins will be in a ratio as, for example, in the order of 5 to 1. Consequently, the force imposed on each of the inner ends of the shear pins can be developed into a thrust as of about 52,000 pounds. This stated range of force is preferably above the optimum degree of actual force to be applied before failure of one or both of the shear pins. Failure should occur before operation of the cylinder actuator has produced a force, as aforementioned in the range of 10,400 pounds, at the lower end of the lever. This is desired since from actual computations it has been ascertained that if shear pins can survive a thrust by a force as of 52,000 pounds, by way of example, they will, in actual use, cause damage to the motor driving shaft Dr and/or the gearing or other elements driven by the shaft Dn. This is, of course, to be avoided if at all possible. Contrariwise, if failure of the specimen shear pins occurs during gradual application of a lesser degree of force, it can be determined that the pins, by their basic compositions, should sustain applications of power normally incurred by the driving force of shaft Dr and resistance to use of the force by the shaft Dn.

When the shear testing of a number of specimen pins has been completed, the pin in axle 42 is withdrawn and said axle is removed from the connector block 291 and the lower arms 40 of the lever 33. As indicated in broken line in FIG. 4, the unit 28 can be swung to an inoperable position in which it can be supported by a pin or bolt inserted through the said sidewalls 22 and 23.

FATIGUE TESTING

During the performance of the above-described testing for pin failure by shearing action, the fatigue testing unit 30 can be bodily removed from the apparatus as is noted by reason of its absence from the illustrated form of apparatus of FIG. 1. This is accomplished by separation of the body members 301 and lever 33 upon removal of the axle 42. By removal of the screws 315 and cap 314, the body member 302 can be separated from the crankshaft 346. When the unit 30 is to be put to use, the cap 314 serves to reunite the body member 302 and the crankshaft while alignment of the holes 41 in the arms 40 of the lever 33 with the sleeve bearing 309 will permit insertion of the axle 42.

During controlled operation of the motor 358, the eccentric shaft portion 345 of crankshaft 346 will produce rotation of the body portion 302 at a speed of, as by way of example, 78 r.p.m. (revolutions per minute). Now, according to the degree of eccentricity, this action of the member 302 will be received at the body member 301 in a rapidly occurring series of reciprocal motions that are imparted to the shear pins P through the lever 33, Here the distance ratio between the axes of the axle 42, the axle 32 and the inner ends of the shear pins in the upper arms 37, as in the order of 5 to 1, will reduce the distance of reciprocally applied thrust. It has been determined that specimen pins surviving the vibrations produced by these reciprocal motions during operation of the motor 358 to carry out between 200 to 400 revolutions will exhibit physical structures such that they will not fail by reason of fatigue within a predictable period of time. Preferably, the notch design and metal compositions of specimen shear pins are selected from such pins that do not fail until an upper range, as from 350 to 390 revolutions, has been obtained. In this way, utility of the pins can be computed within predictable values so that the pins can be replaced after substantially regularly spaced intervals of time. Of course, specimen pins that fail after being subjected to vibratory forces of short duration would indicate that their metal compositions could be unsatisfactory for certain uses and could create unforeseen and undesired emergencies with resultant loss of productive time.

During reciprocal motion of the unit 30, the initial resistance of the pair of shear pins is transmitted by the lever 33 to the body member 301 and through the plates 321 and 322 to the pairs of rubber blocks 324 and 325. Consequently, the absorbed pressure will result in sliding of the several screws 338 relative to the plate 322 and pair of bars 323 as the blocks are compressed and the distance between eccentric shaft 345 and axle 42 is rapidly foreshortened and then lengthened.

I claim:

1. Apparatus for testing bars, rods, pins and the like comprising a frame, means for supporting an article to be tested on said frame, first means carried by said frame for exerting pressure in one direction, second means carried by said frame for exerting reciprocating pressure, and means carried by said frame for selectively transmitting and applying pressures from said first and second pressure-exerting means to said article, said transmitting means comprising a lever mounted to bear adjacent one of its ends against said article and for selective engagement adjacent its opposite end with said first and second pressure-exerting means.

2. Apparatus as defined in claim 1, in which said frame is generally A-shaped said article is mounted adjacent the peak of said "A," said lever is pivotally mounted adjacent said peak but below said article, and means are provided for mounting said first and second pressure-exerting means at the base of opposite legs of said "A" and in position to exert pressure against said lever adjacent its lower end.

3. Apparatus as defined in claim 2, in which said means for exerting pressure in one direction includes a cylinder actuator, a piston operable within said cylinder actuator, and means associated with opposite ends of said cylinder actuator for supplying fluid thereto and discharging it therefrom.

4. Apparatus as defined in claim 3, in which said cylinder actuator is mounted for movement out of said operative position, and means are provided for retaining it out of said position when so moved.

5. Apparatus as defined in claim 2, in which means is provided for connecting said reciprocating pressure-exerting means to said lever, and said connecting means includes a pressure absorbing unit comprising aligned members mounted for movement relative to one another, and resilient members between said movable aligned members.

6. Apparatus as defined in claim 2, in which said reciprocating pressure exerting means includes a crankshaft, means for connecting said crankshaft to said lever, and a pressure absorbing unit in said connecting means.

7. Apparatus as defined in claim 6, in which said reciprocating pressure exerting means also includes a motor mounted on a leg of said "A" with means for driving said crankshaft from said motor, and said pressure absorbing unit comprises a plurality of plates arranged in face-to-face relation with a layer of resilient material between said faces.

8. Apparatus as defined in claim 1, in which means is provided for supporting two articles to be tested in aligned relationship in said frame, said lever is formed with spaced arms adjacent its upper end, and each arm of said lever is adapted to surroundingly engage one of said articles.

9. Apparatus as defined in claim 8, in which said means for exerting pressure in one direction is movable into and out of operable position, and means is provided for retaining the same out of operable position.

* * * * *